United States Patent
Dryfoos et al.

(10) Patent No.: US 11,093,451 B2
(45) Date of Patent: *Aug. 17, 2021

(54) DATA FRAGMENTATION TUNING AND CANDIDACY PERSISTENCE

(71) Applicant: International Business Machines Corporation, Armonk, NY (US)

(72) Inventors: Robert O. Dryfoos, New Canaan, CT (US); James V. Farmer, Wappingers Falls, NY (US); Bradd A. Kadlecik, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 247 days.

This patent is subject to a terminal disclaimer.

(21) Appl. No.: 16/241,070

(22) Filed: Jan. 7, 2019

(65) Prior Publication Data

US 2019/0138499 A1    May 9, 2019

Related U.S. Application Data

(63) Continuation of application No. 15/204,244, filed on Jul. 7, 2016, now Pat. No. 10,216,753, which is a continuation of application No. 14/043,868, filed on Oct. 2, 2013, now Pat. No. 9,436,696.

(51) Int. Cl.
*G06F 16/17* (2019.01)
*G06F 16/215* (2019.01)

(52) U.S. Cl.
CPC ...... *G06F 16/1727* (2019.01); *G06F 16/1724* (2019.01); *G06F 16/215* (2019.01)

(58) Field of Classification Search
None
See application file for complete search history.

(56) References Cited

U.S. PATENT DOCUMENTS

| | | | |
|---|---|---|---|
| 6,571,261 B1 | 5/2003 | Wang-Knop | |
| 7,487,105 B2 | 2/2009 | Jacobs | |
| 7,562,203 B2 | 7/2009 | Scott | |
| 7,921,103 B2 | 4/2011 | Olston | |
| 8,051,115 B2 | 11/2011 | Biller | |
| 8,190,811 B2 | 5/2012 | Moon | |

(Continued)

OTHER PUBLICATIONS

List of IBM Patents and Patent Applications Treated as Related. Filed Jan. 7, 2019. 2 pages.

(Continued)

*Primary Examiner* — Taelor Kim
(74) *Attorney, Agent, or Firm* — Michael A. Petrocelli

(57) ABSTRACT

A method for implementing defragmentation of a data area is provided. The method includes receiving a data change event for the data area and determining, whether the data area has exceeded a defragment threshold based on a defragment threshold value. The method may further include adding the data area to a candidacy list when the data area is determined to have exceeded the defragment threshold based on the defragment threshold value. The method may also include defragmenting the data area when the data area is determined to have exceeded the defragment threshold based on the defragment threshold value and removing the data area from the candidacy list following the determination.

5 Claims, 4 Drawing Sheets

(56) References Cited

U.S. PATENT DOCUMENTS

| | | | |
|---|---|---|---|
| 8,244,992 B2 | 8/2012 | Spackman | |
| 8,990,477 B2* | 3/2015 | Parker | G06F 12/0246 |
| | | | 711/103 |
| 9,436,696 B2 | 9/2016 | Dryfoos | |
| 2004/0148476 A1 | 7/2004 | Altare | |
| 2007/0088912 A1 | 4/2007 | Mukherjee | |
| 2008/0177994 A1 | 7/2008 | Mayer | |
| 2009/0254594 A1 | 10/2009 | Burchall | |
| 2011/0099326 A1* | 4/2011 | Jung | G06F 3/0613 |
| | | | 711/103 |
| 2011/0225164 A1 | 9/2011 | Narasayya | |
| 2012/0284474 A1 | 11/2012 | Lehr | |
| 2012/0303918 A1 | 11/2012 | Reed | |
| 2013/0254458 A1* | 9/2013 | Pittelko | G06F 12/0246 |
| | | | 711/103 |
| 2016/0314137 A1 | 10/2016 | Dryfoos | |

OTHER PUBLICATIONS

Amer, et al., "A Heuristic Approach to Re-Allocate Data Fragments in DDBSs", 2012 International Conference on Information Technology and e-Services, 2012 IEEE, 6 pages.

Benkrid, et al., "A Combined Selection of Fragmentation and Allocation Schemes in Parallel Data Warehouses", 19th International Conference on Database and Expert Systems Application, 2008 IEEE, pp. 370-374.

* cited by examiner

DATA FRAGMENTATION TUNING AND CANDIDACY PERSISTENCE

FIELD OF THE INVENTION

The present invention relates generally to the field of computing and more particularly to the defragmentation of data areas.

BACKGROUND

Currently in computing, data fragmentation is a common phenomenon when storage of a fixed size is used for data fragments of varying sizes. As data fragments are added and deleted from the storage areas, the storage space may become fragmented with areas of unused space existing between areas of in use space. As time progresses, these storage areas typically may become more fragmented requiring more storage than what would logically be needed. As such, the difference between the logical storage requirement and the physical storage usage may then determine the amount of fragmentation that exists.

To rectify this problem, an expensive operation is typically needed to compact or defragment the storage (i.e., data) area, removing all the empty spaces. However, due to the expense of performing the defragmentation operation, it is not desirable to perform the defragmentation operation often.

Furthermore, current methods of defragmentation merely try to defragment any space that can be defragmented without determining which storage areas need to be defragmented. Additionally, these methods of defragmentation typically involve a search for items to defragment. As such, this may be an input/output (I/O) intense process depending on the size and scope of the search for fragmented data areas. Therefore, the performance benefits of defragmenting frequently accessed data areas may be compromised.

SUMMARY

A processor-implemented method for implementing a first manager and a second manager for defragmenting a data area is provided. The method may include receiving, by the first manager, a data change event for the data area and determining, by the first manager, based on the occurrence of the data change event, whether a data area has exceeded the defragment threshold based on a defragment threshold value. The method may further include adding the data area to a candidacy list, by the first manager, when the data area is determined to have exceeded the defragment threshold based on the defragment threshold value and determining, by the second manager, whether the data area has exceeded the defragment threshold based on the defragment threshold value. The method may also include defragmenting the data area, by the second manager, when the data area is determined to have exceeded the defragment threshold based on the defragment threshold value and removing the data area, by the second manager, from the candidacy list following the determination.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
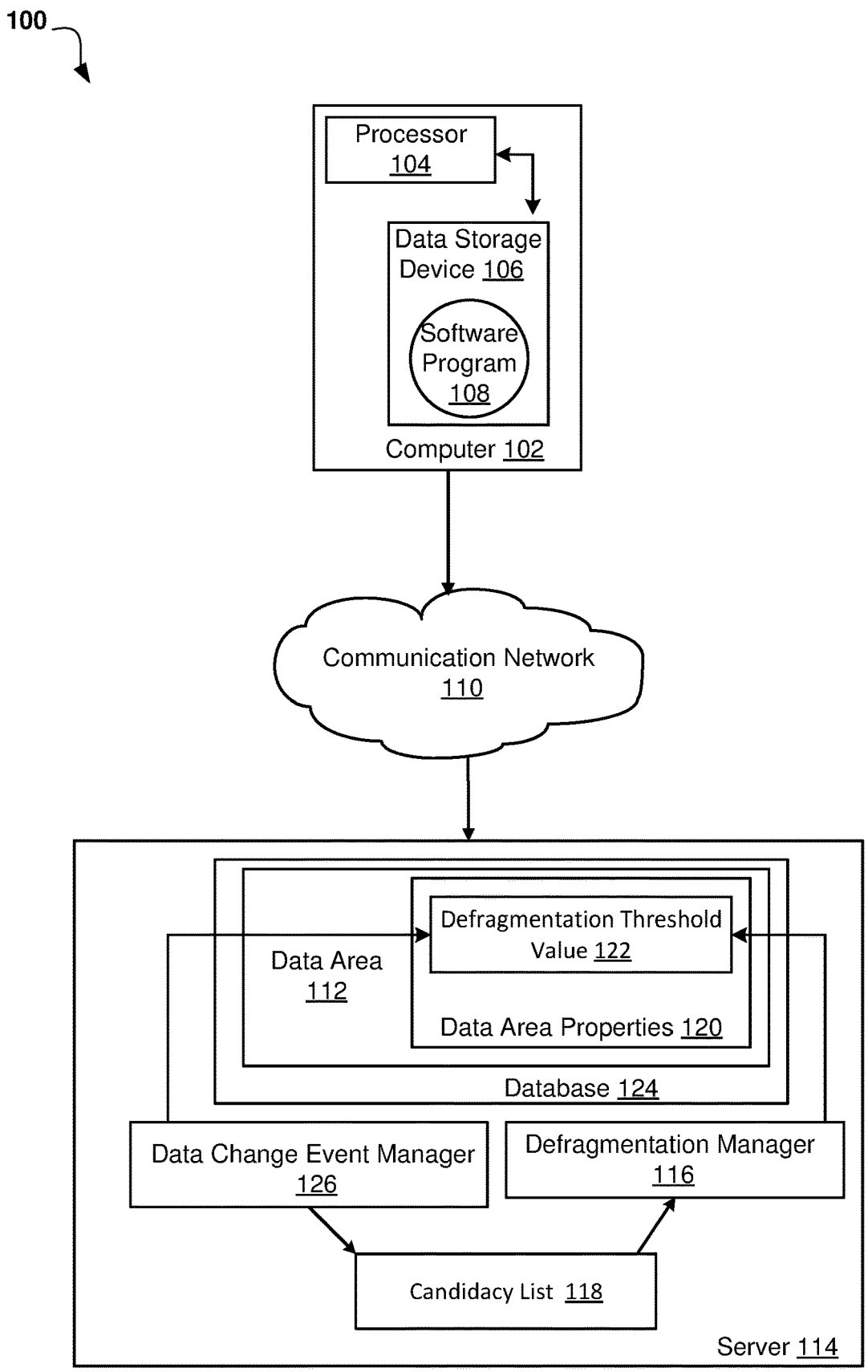
FIG. 1 illustrates the hardware that may be used in a networked computer environment with an exemplary data change event manager and a defragmentation manager according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computing and more particularly to the defragmentation of data areas. The following described exemplary embodiments provide a system, method and program product for implementing a defragmentation threshold value associated with a data area based on a defragmentation assessment of the data area at the time the data area is changed.

In the maintenance of file systems, defragmentation is a process that reduces the amount of fragmentation. Defragmentation physically organizes the contents of the mass storage device used to store files into the smallest number of contiguous regions (fragments). Defragmentation also attempts to create larger regions of free space using compaction to impede the return of fragmentation.

As previously described, expensive methods exist to compact or defragment the storage (i.e., data) area, removing all the empty spaces. However, due to the expense of performing the defragmentation operation, it is not desirable to perform the defragmentation operation often. Also, there may be different degrees of fragmentation. For example, having many small data fragments of varying size may cause much less fragmentation problems then having many large data fragments of varying sizes. As a result, some areas may be frequently updated and trying to defragment those areas may cause additional work with very little benefit.

Furthermore, the current methods of defragmentation try to defragment any space that can be defragmented without determining which storage areas need to be defragmented. Additionally, current methods involving defragmentation typically involve a search for items to defragment. As such, this may be an input/output (I/O) intense process depending on the size and scope of the search for fragmented data areas. This may be particularly problematic for data areas that may be frequently accessed during all hours in a global economy since the additional load on the system to perform this type of search may result in this type of search to be performed less often. As such, the performance benefits of defragmenting those frequently accessed data areas may be compromised.

According to at least one embodiment of the present invention, a defragmentation threshold value may be utilized on a data area basis that may allow for some areas to be designated as more highly fragmented than others and as a result not cause additional overhead of defragmenting less fragmented data areas. This threshold value may further be adjusted and changed dynamically between each data area defragmentation operation. As such, data fragmentation tuning may be performed through modification of the defragmentation threshold value on a data area basis. Data fragmentation tuning may be performed by collecting information pertaining to how often a particular data area is read as opposed to written to, added to, or deleted from. Additionally, information may also be ascertained between each defragmentation interval in order to determine how often a particular data area is defragmented and an average size of the data fragments associated with a data area. This is particularly advantageous in reducing the amount of time defragmentation process takes in addition to reducing the unavailability of data areas due to defragmentation actually taking place at a particular time.

In accordance with at least one embodiment of the present invention, the location of data areas is examined at the time of a change to determine if defragmentation may be beneficial at that particular time of change. Therefore, no additional search would be needed to be performed at a later time, since a record (i.e., a candidacy list) of these data areas concerning whether they require defragmentation may be kept. As a result, defragmentation may be performed more often without having to incur an expensive search for fragmented data areas.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The following described exemplary embodiments provide a system, method and program product for implementing and recording a defragmentation threshold value associated with a data area based on a defragmentation assessment of the data area at the time the data area is changed. Additionally, embodiments of the present invention may ensure performance gain by re-assessing and defragmenting only the data areas that have been recorded as possible candidates for defragmentation based on the data area's associated defragmentation threshold value.

According to at least one embodiment of the present invention, a defragmentation threshold value may be utilized on a data area basis that may allow for some areas to be designated as more highly fragmented than others and as a result not cause additional overhead of defragmenting less fragmented data areas. The defragmentation threshold value may be defined by the user as a percentage representing desired utilization. For example, in one implementation of the present embodiment, the user may specify 30% as the defragment threshold value. As such, the data area may consist of up to 30% of unused space before being a candidate for defragmentation. According to one implementation of the present invention, the amount of fragmentation (i.e., a defragmentation threshold value or fragmentation factor) may be added as a defragmentation threshold value to a set of pre-existing properties that define each data area. When defragmentation is performed, a defragmentation manager may access these properties to determine if the logical data size with the fragmentation factor is large enough to benefit from being defragmented at this time.

Furthermore, in accordance with an embodiment of the present invention, the location of data areas may be examined by a data change event manager at the time of a data change to a data area to determine if that data area may be a candidate for defragmentation. As such, whenever the logical size of a data area is modified, a check may be performed by the data change event manager to determine if defragmentation would be beneficial by comparing the physical size of the data area versus the logical size of the data area since the difference between the logical storage requirement and the physical storage usage may then determine the amount of fragmentation that exists (i.e., an average size of data fragments associated with a data area). The logical size of a data area may not always match the physical size. If the logical size is smaller then it may not be beneficial to defragment the data area. This is just one of the criteria that may be used to determine the defragmentation threshold value for that area.

According to one implementation of the present invention, a candidacy list or record may be stored with a reference to the data areas that may benefit from defragmentation. As such, no search would have to be done prior to the defragmentation process to determine which data areas require defragmentation. Conversely, the list may be accessed by a defragmentation manager at the time of defragmentation and those areas on the list may be defragmented without the necessity of an intensive I/O search process.

Referring to FIG. 1, an exemplary networked computer environment 100 in accordance with one embodiment is depicted. The networked computer environment 100 may include a computer 102 with a processor 104 and a data storage device 106 that is enabled to run a software program 108. The networked computer environment 100 may also include a server 114 that is enabled to run a defragmentation manager 114 and a data change event manager 126. The defragmentation manager 114 and the data change event manager may interact with a database 124 and a communication network 110. The database 124 may have a data area 112 and may have data area properties 120.

The networked computer environment 100 may include a plurality of computers 102 and servers 114 and a plurality of data areas, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with database 124 running on server computer 114 via the communications network 110. The communications network 110 may include connections, such as wire, wireless communication links, or fiber optic cables. Client computer 102 may be, for example, a mobile device, a telephone, a personal digital assistant, a netbook, a laptop computer, a tablet computer, a desktop computer, or any type of computing devices capable of running a program, accessing a network, and accessing a database.

As previously described, the client computer 102 may access data area 112 of database 124, running on server computer 114 via the communications network 110. For example, a user using an application program 108 running on a client computer 102 may connect via a communication network 110 to data area 112 of database 124 which may be running on server 114. Additionally, the data change event manager 126 may record a defragmentation threshold value 122 (i.e., threshold value) that may be stored with the data area properties 120 of data area 112. The defragmentation threshold value 122 may be implemented on data areas 112 allowing for some data areas 112 to be designated as more highly fragmented than other data areas 112 and as a result not cause additional overhead of defragmenting less fragmented data areas 112. The defragmentation threshold value 122 may further be adjusted and changed dynamically between each data area 112 defragmentation operation. The defragmentation threshold value 122 may be ascertained by the defragmentation manager 116. The data change event manager 126 may collect information pertaining to how often a particular data area 112 is changed (i.e., read as opposed to written to, added to, or deleted from). Additionally, information may also be ascertained by the data change event manager 126 (FIG. 1) between each defragmentation interval in order to determine how often a particular data area 112 is defragmented.

According to one implementation of the present embodiment, the location of data areas 112 may be examined by the data change event manager 126 at the time of a data area 112 change to determine if defragmentation would be beneficial at that particular time of change. As such, no additional search may be needed to be performed at a later time to determine if a data area 112 is a good candidate for defragmentation. Additionally, a candidacy list 118 may be stored by a data change event manager 126 on server 114. The candidacy list 118 may include a list of all the data areas 112 that may benefit from defragmentation. The data change event manager process is explained in more detail below with respect to FIG. 2. The defragmentation manager 116 process is explained in more detail below with respect to FIG. 3.

Figure 2:
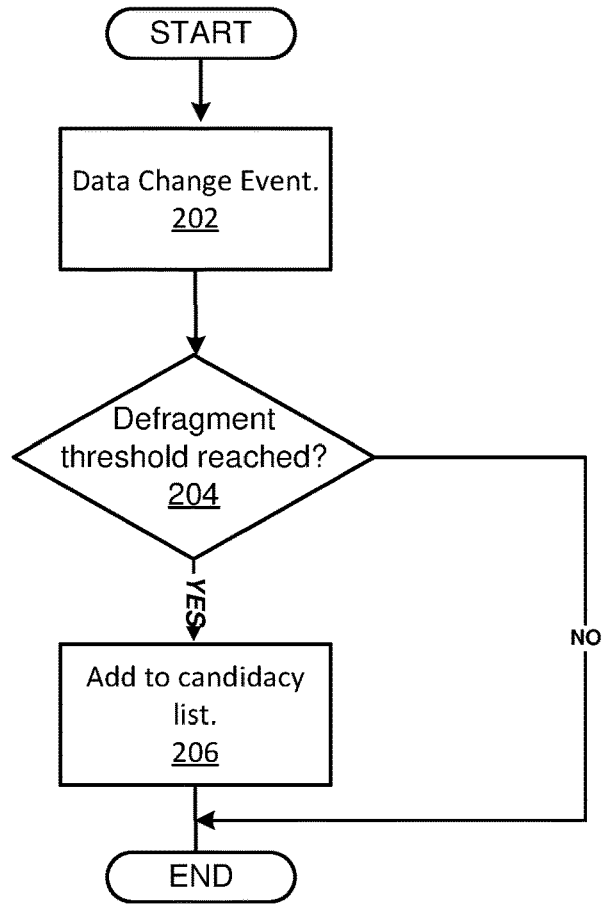
FIG. 2 is an operational flowchart illustrating the steps carried out by a data change event manager according to one embodiment.

Referring now to FIG. 2, an operational flowchart illustrating the steps carried out by a data change event manager according to one embodiment is depicted. As previously described, a data change event manager 126 (FIG. 1) may examine the location of data areas 112 (FIG. 1) at the time of a data change, for example, a data add, write or delete (as opposed to a data read or access) to a data area 112 (FIG. 1) to determine if that data area 112 (FIG. 1) may be a candidate for defragmentation. As such, whenever the logical size of a data area 112 (FIG. 1) is modified, a check may be performed by the data change event manager 126 (FIG. 1) to determine if defragmentation would be beneficial by comparing the physical size of the data area versus the logical size of the data area 112 (FIG. 1). According to one implementation of the present invention, a candidacy list 118 (FIG. 1) may be stored with a reference to the data areas 112 (FIG. 1) that may benefit from defragmentation. As such, no search would have to be done prior to the defragmentation process to determine which data areas require defragmentation. Conversely, the list may be accessed by a defragmentation manager (described later with respect to FIG. 3) at the time of defragmentation and those areas on the list may be defragmented without the necessity of an intensive I/O search process.

At 202, a data change event occurs. For example, the data area 112 (FIG. 1) is written to, added to or deleted from as opposed to read or accessed. Then at 204, the defragmentation threshold is checked. The defragmentation threshold value 122 (FIG. 1) for that specific data area 112 (FIG. 1) is used to determine the defragment threshold. The defragment threshold value may be used to compute the maximum amount of resource that would be used (i.e., the defragment threshold). For example purposes only, the following may be defined:

B=logical size of the data area
N=number of physical blocks in use
P=defragment threshold value
M=defragment threshold At data change time (i.e., data change event), M may be calculated as the following:

$$M=B/((1-P)*\text{physical block size})$$

Once M, is computed, then M may be compared to N to determine if the current utilization is greater than or less than the maximum fragmentation utilization as provided by the defragment threshold. Since M must be a whole number, the ceiling(M) may be used which would convert any fraction of M to the smallest integer not less than M. Therefore, for a data area 112 (FIG. 1) to be a candidate for defragmentation, the following must be true:

$$\text{Ceiling}(M)<N$$

If the number of physical blocks in use is greater than the number that would be in use with the maximum amount of allowable fragmentation, then the data area 112 (FIG. 1) maybe a candidate for defragmentation.

If at 204, (based on the analysis previously described) it is determined that the data area is a candidate for defragmentation, then the data area is added to a candidacy list 118 (FIG. 1) at 206. The candidacy list 118 (FIG. 1) may be examined at a later time rather than performing an exhaustive search to determine which data areas 112 (FIG. 1) are potential candidates for defragmentation. As previously explained, the candidacy list 118 (FIG. 1) may include a list of all the data areas 112 that may benefit from defragmentation at a later time (e.g. a scheduled time). This may be beneficial since the data areas 112 (FIG. 1) are not being automatically defragmented at the time of change, but rather the data areas 112 (FIG. 1) may be evaluated at the time of a change to be defragmented at a later time. For example, it may have less impact on the system to schedule a defragmentation time that is not during peak time, but rather during system down time. Then the scheduled defragmentation may be performed without the necessity of an extensive I/O search process and without impacting system performance. Furthermore, the candidacy list 118 (FIG. 1) may useful in determining how many data areas 112 (FIG. 1) may need to be defragmented. The candidacy list 118 (FIG. 1) may also aide in estimating the amount of time that may be needed to defragment the data areas and in deciding the best time to schedule the defragmentation.

If at 204, it is determined (based on the analysis previously described) that the data area is not a candidate for defragmentation, then the data area is not added to the candidacy list 118 (FIG. 1). The examination of the candidacy list 118 (FIG. 1) is explained in more detail below with respect to FIG. 3.

Figure 3:
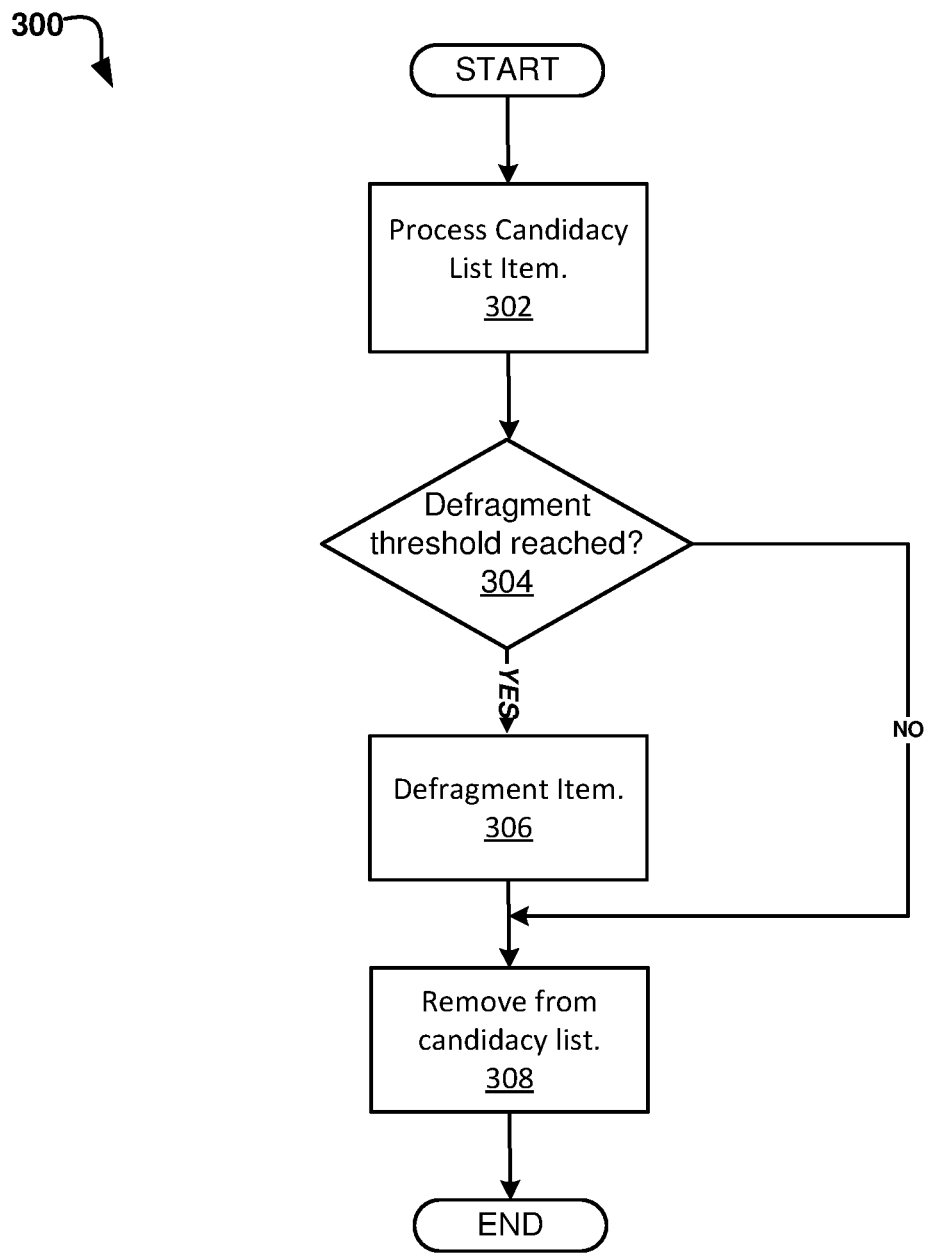
FIG. 3 is an operational flowchart illustrating the steps carried out by a defragmentation manager according to one embodiment.

Referring now to FIG. 3, an operational flowchart illustrating the steps carried out by a defragmentation manager is depicted. As previously explained with respect to FIG. 2, the method may be implemented by providing a candidacy list 118 (FIG. 1) that may be stored with a reference to the data areas 112 (FIG. 1) that may benefit from defragmentation at a later time. As such, no search would have to be done prior to the defragmentation process to determine which data areas require defragmentation. Conversely, the list may be accessed by a defragmentation manager 116 (FIG. 1) at the time of defragmentation and the defragmentation threshold value 122 (FIG. 1) of those data areas 112 (FIG. 1) on the list may be re-examined. If the data area has exceeded the defragment threshold based on the defragment threshold value then the data areas 112 (FIG. 1) may be defragmented without the necessity of an intensive I/O search process.

At 302, an item on the candidacy list 118 (FIG. 1) may be processed by the defragmentation manager 116 (FIG. 1). For example, defragmentation may be scheduled every night during an off-peak time and before the actual defragmentation occurs, the candidacy list 118 (FIG. 1) may be processed by the defragmentation manager 116 (FIG. 1). The defragmentation manager 116 (FIG. 1) may process each item on the candidacy list 118 (FIG. 1) and at 304, the defragmentation threshold value 122 (FIG. 1) is re-assessed and it is determined whether the data area has exceeded the defragment threshold based on the defragment threshold value. According to one implementation, defragmentation threshold value 122 (FIG. 1) may manually be changed to result in either more or less defragmentation candidates.

If at 304, it is determined that the data area 112 (FIG. 1) has exceeded the defragment threshold based on the defragment threshold value then the data area 112 (FIG. 1) remains on the candidacy list 118 (FIG. 1) and is defragmented at 306 and then removed from the candidacy list 18 (FIG. 1) at 308.

If at 304, it is determined that the data area 112 (FIG. 1) has not exceeded the defragment threshold based on the defragment threshold value (FIG. 1) then the data read 112 (FIG. 1) is not defragmented and the data area 112 (FIG. 1) is removed from the candidacy list 118 (FIG. 1) at 308.

Figure 4:
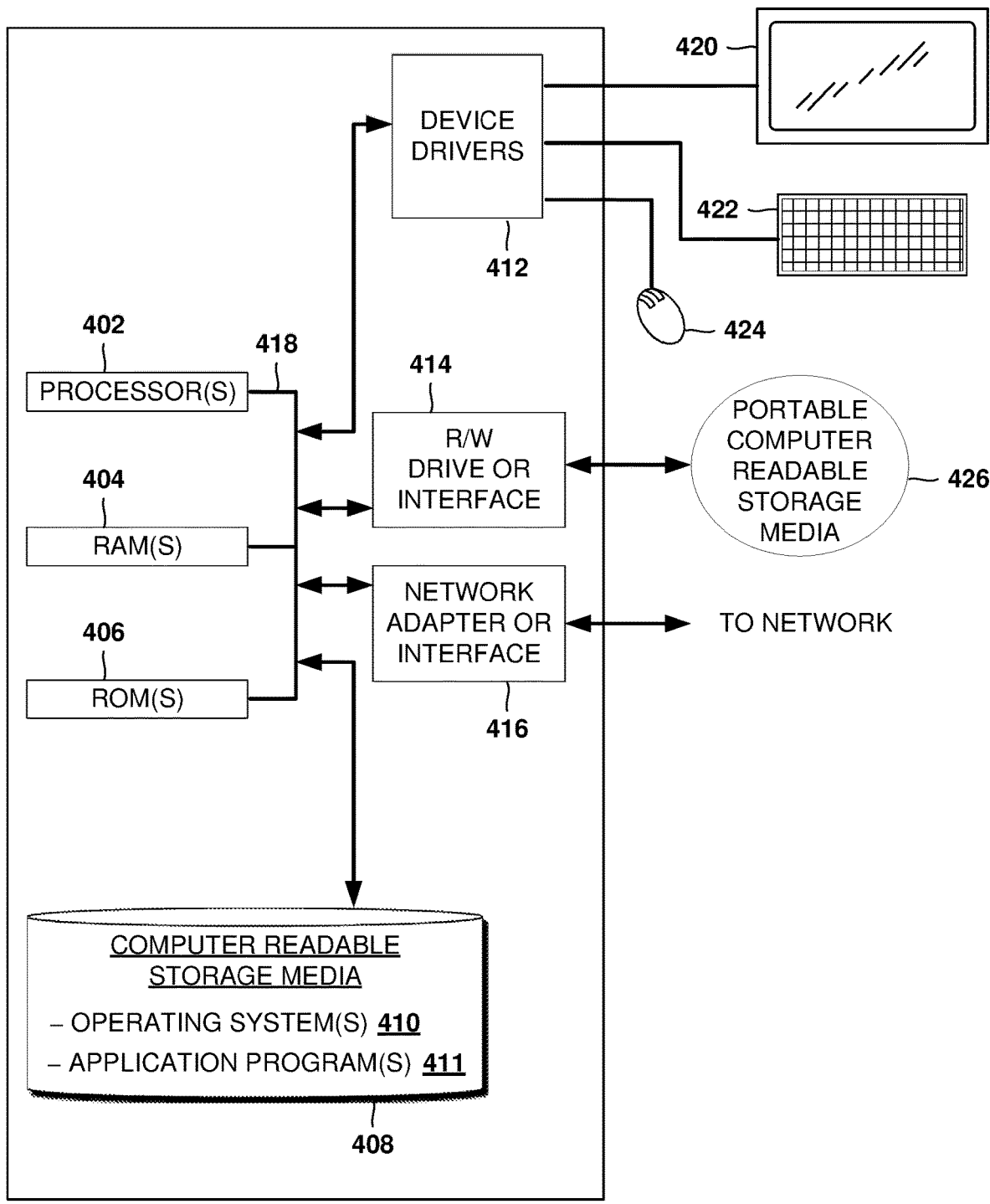
FIG. 4 is a block diagram of internal and external components of computers and servers depicted in FIG. 1.

Referring now to FIG. 4, a block diagram of components of client computer 102 and server computer 114 of networked computer environment 100 of FIG. 1 is shown, according to an embodiment of the present disclosure. It should be appreciated that FIG. 4 provides only an illustration of one implementation and does not imply any limitations regarding the environments in which different embodiments may be implemented. Many modifications to the depicted environment may be made.

Client computer 102 and server computer 114 may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411 are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Client computer 102 and server computer 114 may also include a R/W drive or interface 414 to read from and write to one or more portable computer readable storage media 426. Application programs 411 on client computer 102 and server computer 114 may be stored on one or more of the portable computer readable storage media 426, read via the respective R/W drive or interface 414 and loaded into the respective computer readable storage media 408.

Client computer 102 and server computer 114 may also include a network adapter or interface 416, such as a TCP/IP adapter card or wireless communication adapter (such as a 4G wireless communication adapter using OFDMA technology) for connection to a network 428. Application programs 411 on client computer 102 and server computer 114 may be downloaded to the computing device from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

Client computer 102 and server computer 114 may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may comprise hardware and software (stored on computer readable storage media 408 and/or ROM 406).

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java, Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for implementing a first manager and a second manager for defragmenting a data area, the computer program product comprising:

a computer readable storage medium having program instructions embodied therewith, wherein the computer readable storage medium is not a transitory signal per se, the program instructions executable by a device to cause the device to perform a method comprising:

determining, by the first manager, based on an occurrence of a data change event for the data area, whether the data area has exceeded a defragment threshold based on a defragment threshold value, wherein the defragment threshold value is a pre-determined number that has been added to a set of pre-existing properties that define the data area, wherein the set of pre-existing properties dynamically change based on a defragmentation tuning that modifies the defragment threshold value based on a frequency of a plurality of changes associated with the data area, the defragmentation tuning comprising a collection of information including, but not limited to, how often the data area is read, how often the data area is written to, how often the data area is added to, how often the data area is deleted from, how often the data area is defragmented, and an average size of data fragments associated with the data area, wherein determining the data area has exceeded the defragment threshold comprises calculating a logical size of the data area, calculating a number of physical blocks in use, calculating the defragment threshold value, and calculating the defragment threshold, wherein calculating the defragment threshold comprises:

calculating the defragment threshold at a time associated with the occurrence of the data change event by subtracting the calculated defragment threshold value from 1 to compute a first answer, multiplying the computed first answer by a physical block size to compute a second answer, and dividing the calculated logical size of the data area by the computed second answer to obtain the calculated defragment threshold;

adding the data area to a candidacy list, by the first manager, in response to determining the data area exceeded the defragment threshold, such that defragmentation is performed more often based on the candidacy list without conducting extensive searches for fragmented data areas;

determining, by the second manager, whether the data area has exceeded the defragment threshold based on the defragment threshold value;

defragmenting, by the second manager, only the data area added to the candidacy list and determined by the second manager to have exceeded the defragment threshold without defragmenting less fragmented data areas; and removing the data area, by the second manager, from the candidacy list following the determination.

2. The computer program product of claim 1, wherein determining the data area has exceeded the defragment threshold comprises:

comparing the calculated defragment threshold to the calculated number of physical blocks in use.

3. The computer program product of claim 1, wherein obtaining the calculated defragment threshold further comprises:

determining if the calculated defragment threshold is equal to a whole number; and in response to determining the calculated defragment threshold is not equal to a whole number, converting a fraction associated with the calculated defragment threshold to a smallest integer not less than the calculated defragment threshold.

4. The computer program product of claim 1, wherein the data change event comprises at least one of a write to, addition to, or delete from, the data area.

5. The computer program product of claim 1, wherein the defragmentation tuning comprises modification of the defragment threshold value on a data area basis.

* * * * *